United States Patent
Chen et al.

(10) Patent No.: US 12,182,559 B2
(45) Date of Patent: Dec. 31, 2024

(54) DEPLOYMENT OF UPDATED SERVICES OR LAYERS ON DEMAND THROUGH CONTAINERS

(71) Applicant: INTERNATIONAL BUSINESS MACHINES CORPORATION, Armonk, NY (US)

(72) Inventors: Xiao Ling Chen, Changping District (CN); Si Yu Chen, Beijing (CN); Juliet Candee, Brewster, NY (US); Yan Fei Qin, Beijing (CN); Hao Wu, Beijing (CN); Wen Bin Han, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 18/062,266

(22) Filed: Dec. 6, 2022

(65) Prior Publication Data

US 2024/0184558 A1    Jun. 6, 2024

(51) Int. Cl.
G06F 8/61        (2018.01)
G06F 9/54        (2006.01)

(52) U.S. Cl.
CPC .............. *G06F 8/63* (2013.01); *G06F 9/544* (2013.01)

(58) Field of Classification Search
CPC ................................. G06F 8/63; G06F 9/544
See application file for complete search history.

(56) References Cited

U.S. PATENT DOCUMENTS 10,169,209 B2 *   1/2019   McPherson ......... G06F 9/45558
10,303,657 B2 *   5/2019   Huang .................... G06F 8/63
10,324,696 B2 *   6/2019   Bhat ....................... G06F 8/60
(Continued)

FOREIGN PATENT DOCUMENTS

CN        101983366 A   *   3/2011
CN        106227579 A       12/2016
(Continued)

OTHER PUBLICATIONS

Kang et al., "Container and Microservice Driven Design for Cloud Infrastructure DevOps", 2016, IEEE (Year: 2016).*
(Continued)

*Primary Examiner* — Wei Y Zhen
*Assistant Examiner* — Junchun Wu
(74) *Attorney, Agent, or Firm* — Eric Chesley, Esq.; Rachel L. Pearlman, Esq.; Heslin Rothenberg Farley and Mesiti P.C.

(57) ABSTRACT

Computer implemented method, systems, and computer program products include program code executing on a processor(s) obtain a first container comprising image layers, wherein the image layers include a base image layer and one or more image layers. The program code determines dependencies between the image layers. The program code obtains a request for an application where at least one image layer of the one or more image layers comprises features of the application. The program code identifies, based on the dependencies, at least one additional image layer related to the at least one image layer. The program code generates and deploys a second container, where image layers of the second container consist of the at least one image layer, the at least one additional image layer related to the at least one image layer, and the base layer.

20 Claims, 7 Drawing Sheets

(56) References Cited

U.S. PATENT DOCUMENTS

| | | | |
|---|---|---|---|
| 10,324,708 B2* | 6/2019 | Griffin | G06F 8/65 |
| 10,528,337 B1* | 1/2020 | Varadharajan Kannan | G06F 8/71 |
| 10,656,845 B2* | 5/2020 | Jeong | G06F 3/067 |
| 10,810,003 B2* | 10/2020 | Gainsborough | G06F 8/65 |
| 11,093,221 B1* | 8/2021 | Novy | G06F 8/63 |
| 11,934,811 B2* | 3/2024 | Burgazzoli | G06F 8/433 |
| 2017/0068676 A1* | 3/2017 | Jayachandran | G06F 16/125 |
| 2017/0220329 A1* | 8/2017 | Yang | G06F 8/60 |
| 2018/0095973 A1* | 4/2018 | Huang | G06F 16/1748 |
| 2018/0189122 A1 | 7/2018 | Jobi | |
| 2019/0146772 A1* | 5/2019 | Griffin | G06F 8/71 717/121 |
| 2020/0142680 A1* | 5/2020 | Varadharajan Kannan | G06F 8/63 |
| 2020/0272440 A1* | 8/2020 | Burgazzoli | G06F 16/51 |
| 2020/0356806 A1* | 11/2020 | Li | G06F 18/22 |
| 2021/0103450 A1* | 4/2021 | Prasad | G06F 9/45558 |
| 2021/0232344 A1* | 7/2021 | Corrie | G06F 3/0664 |
| 2022/0197689 A1 | 6/2022 | Hotinger et al. | |
| 2022/0229647 A1* | 7/2022 | Mathews | G06F 9/45558 |
| 2024/0086168 A1* | 3/2024 | Douglas | G06F 9/45558 |

FOREIGN PATENT DOCUMENTS

| | | | |
|---|---|---|---|
| CN | 113111353 A | * | 7/2021 |
| WO | WO-2017113374 A1 | * | 7/2017 |
| WO | WO-2022127420 A1 | * | 6/2022 |

OTHER PUBLICATIONS

Piraghaj et al., "ContainerCloudSim: An environment for modeling and simulation of containers in cloud data centers", Jun. 2016, wileyonlinelibrary.com (Year: 2016).*

Pahl et al., "Containers and Clusters for Edge Cloud Architectures—a Technology Review", 2015, IEEE (Year: 2015).*

Sharma et al., "Containers and Virtual Machines at Scale: A Comparative Study", 2016, ACM (Year: 2016).*

Chung et al., "Using Docker in High Performance Computing Applications", 2016, IEEE (Year: 2016).*

Anonymous, "System and Method to Accelerate Building a Docker Image", IP.com, IPCOM000269215D, Mar. 31, 2022, 8 pgs.

* cited by examiner

DEPLOYMENT OF UPDATED SERVICES OR LAYERS ON DEMAND THROUGH CONTAINERS

BACKGROUND

A container image is generally understood to be an unchangeable, static file that includes executable code so it can run an isolated process on information technology (IT) infrastructure. The image, arguably the foundation of container technology, can be understood as a special file system. Images can be utilized to provide not various files, including but not limited to, programs, libraries, resources, and configuration files, which are executed by the container. Images can also include configuration parameters (e.g., anonymous volumes, environment variables, users, etc.), which the containers access during runtime.

SUMMARY

Shortcomings of the prior art are overcome, and additional advantages are provided through the provision of a computer-implemented method of automatically generating and deploying applications on-demand through container images. The computer-implemented method includes: obtaining, by one or more processors, a first container comprising image layers, wherein the image layers include a base image layer and one or more image layers; determining, by the one or more processors, dependencies between the image layers; obtaining, by the one or more processors, a request for an application, wherein at least one image layer of the one or more image layers comprises features of the application; identifying, by the one or more processors, based on the dependencies, at least one additional image layer related to the at least one image layer; and generating and deploying, by the one or more processors, a second container, wherein image layers of the second container consist of the at least one image layer, the at least one additional image layer related to the at least one image layer, and the base layer.

Shortcomings of the prior art are overcome, and additional advantages are provided through the provision of a computer program product for automatically generating and deploying applications on-demand through container images. The computer program product comprises a storage medium readable by a one or more processors and storing instructions for execution by the one or more processors for performing a method. The method includes, for instance: obtaining, by the one or more processors, a first container comprising image layers, wherein the image layers include a base image layer and one or more image layers; determining, by the one or more processors, dependencies between the image layers; obtaining, by the one or more processors, a request for an application, wherein at least one image layer of the one or more image layers comprises features of the application; identifying, by the one or more processors, based on the dependencies, at least one additional image layer related to the at least one image layer; and generating and deploying, by the one or more processors, a second container, wherein image layers of the second container consist of the at least one image layer, the at least one additional image layer related to the at least one image layer, and the base layer.

Shortcomings of the prior art are overcome, and additional advantages are provided through the provision of a system for automatically generating and deploying applications on-demand through container images. The system includes: a memory, one or more processors in communication with the memory, and program instructions executable by the one or more processors via the memory to perform a method. The method includes, for instance: obtaining, by the one or more processors, a first container comprising image layers, wherein the image layers include a base image layer and one or more image layers; determining, by the one or more processors, dependencies between the image layers; obtaining, by the one or more processors, a request for an application, wherein at least one image layer of the one or more image layers comprises features of the application; identifying, by the one or more processors, based on the dependencies, at least one additional image layer related to the at least one image layer; and generating and deploying, by the one or more processors, a second container, wherein image layers of the second container consist of the at least one image layer, the at least one additional image layer related to the at least one image layer, and the base layer.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
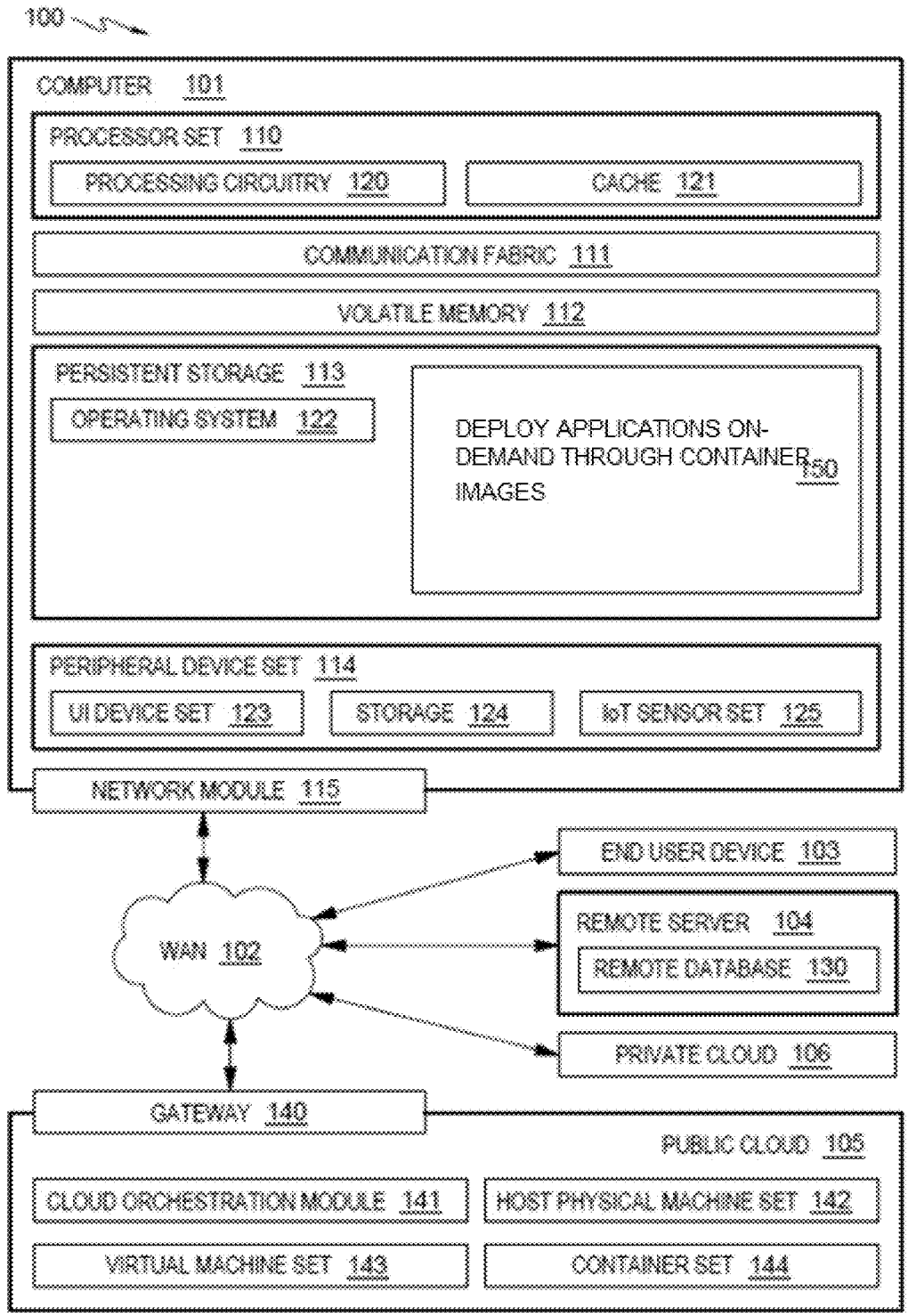
FIG. 1 depicts one example of a computing environment to perform, include and/or use one or more aspects of the present invention.

Images are distributed to provide upgraded programmatic elements. As such, when an image is committed, in existing systems, all the contents of the image layers can be pushed to a repository in the form of an image. When pulling an image from the repository, a consumer of the image (e.g., a resource in a computing system) will download all the contents of the specified image layers and all parent layers to a local resource. Layers can include, but are not limited to, pervasive features, High Impact/Pervasive program temporary fixes (HIPER) features, recommended features, new features, and a base image. Because all layers are uploaded and/or downloaded together, even when only certain layers are being refreshed, the download will include all layers. The necessity in existing systems of downloading and/or uploading all layers increases system overhead including container deployment time. Additionally, when only a specific package (and not all updated packages) is desired to address a particular situation (e.g., a banking customer requires an update HIPER features to address potential outages or security issues), updating an entirety of a resource introduces risk. Building specific images for all customers and situations is not a scalable solution. Thus, a need exists to deploy specific (targeted) applications on-demand via container images.

Throughout this paper, the terms "image layer" and "node" are used interchangeably because, as will be described herein, in embodiments of the present invention, the program code generates a directed graph to identify dependencies between image layers where each image layer comprises a node of the directed graph.

Embodiments of the present invention provide a system and method to deploy applications on-demand through container images. Unlike existing approaches, the examples herein enable a customized and targeted deployment to fulfill specific technical needs, rather than a blanket deployment of all image layers, as the latter increases both system overhead and risk. In some of the examples herein, program code executing on one or more processors deploys updated services or layers on demand through containers. In embodiments of the present invention, the program code determines dependencies between image layers when generating and deploying containers such that a user can receive a more targeted container with current and/or interdependent layers, rather than a deployment that includes unnecessary overhead. To this end, as explained in greater detail herein, the program code analyzes layers for dependencies and groups interdependent changes within the layers based on both these dependencies and on when the changes were implemented (as compared to the last image refresh of the target machine). For example, the program code can generate an ILDG (incremental layer directed graph) and utilize the ILDG to identify sequences of image layers (referred to herein as submissive sequences and dependent sequences) of the image layers. The program code also monitors the timing of uploading (e.g., timestamps) and which files modify other files. Based on understanding these dependencies and the timing of the changes to the elements in addition to which elements modify common elements, the program code can deploy updated services or layers on demand through containers without including excess content in the deployments.

As will be explained herein, program code in various embodiments of the present invention builds a multiple hierarchy directed graph of the image layers referred to herein as an ILDG. This directed graph includes the timestamps of the uploading and the modification of the files. Uploading refers to when new copies of various files were uploaded and modification refers to which files a given file modifies. For example, certain layers can modify the same file. The ILDG includes (represents) at least two types of relationships among the images: submissive sequences and dependent sequences. A submissive sequence is a sequence that is based on a timestamp of uploading of the layer(s) and/or applications. A dependent sequence is a sequence and is based on dependency of layers based on modifications of the files (there is a dependency when layers modify the same file). The program code can generate a dependent sequence by searching a node's parent dependent nodes with the modification of the files. The program code can generate a submissive sequence by searching a node's parent submissive nodes with the timestamp of uploading of the files.

The program code generates an ILDG with both the submissive sequence and the dependent sequence. In generating the ILDG, the program code can map submissive nodes to dependent nodes to represent relationships (e.g., dependencies). In tracking these relationships between image layers, the program code can utilize various attributes, including but not limited to a relationship identifier (Relation ID) and a relationship identifier list (Relation ID List). A Relation ID, which the program code can calculate for a given node by applying a hash algorithm to its ancestor submissive nodes' image identifiers, uniquely matches an image to a layer. Meanwhile, the Relation ID List records all the parent the dependent nodes' Relation IDs for a given node. The program code builds a dependent sequence through the Relation ID list.

As will be explained herein, program code in embodiments of the present invention deploys applications on-demand through container images based on understanding both the timing of the changes made to the image layers that comprise the containers and the dependencies between these layers. The program code generates a directed graph and utilizes the directed graph to configure a container for deployment. when a client requests a container to update a given application, the program code can generate a container without additional elements that would increase risk and overhead. In some embodiments of the present invention, to deploy applications on-demand through container images, when committing images into a repository, the program code produces the directed graph (e.g., ILDG) of image layers based on a submissive sequence and a dependent sequence. To produce the directed graph, the program code: 1) generates a dependent sequence by searching the nodes' parent dependent nodes with the modification of the files; and 2) generates a submissive sequence by searching the nodes' parent submissive nodes with the timestamps of uploading. The program code module that produces the directed graph can be referred to as an ILDGP (Incremental Layer Directed Graph Producer) module. In some examples, program code also consumes ILDGs of image layers when pulling the image from the repository to graph and configure a deployment of updated services or layers (on demand) through containers. The program code that consumes the directed graph to configure the deployment can be referred to as an IRGC (Incremental Layer Directed Graph Consumer) module.

Embodiments of the present invention are inextricably tied to computing and are directed to a practical application. Embodiments of the present invention are rooted in computer technology and address a specific challenge in computer technology by providing a technical solution. The issue that is addressed by the examples herein is that when a container is deployed, more layers than required by the resource are deployed causing additional overhead and exposing the resource to risks. The examples herein provide a system and method for generating and deploying a container on demand that based on understanding the dependencies of the layers and when the changes to the various layers were implemented, the program code can deploy a flexible container, on-demand. The program code can generate a targeted container for deployment that does not include extra applications or features. Not only are the examples inextricably tied to computing, but the examples herein are integrated into a practical application.

Embodiments of the present invention provide significantly more than existing container deployment techniques.

The examples herein enable a resource to download image layers on-demand and in a manner that affects, for example, a production environment of and enterprise level customer (in which this resource resides) as little as possible, when updating and exploiting the new features or fixes. The examples herein increase the speed of deployments by reducing the image layers downloaded therein. In testing and development phases of projects, utilizing the examples herein enable testing groups to switch to container working environments. The examples herein are transparent to end users and are compatible with current container tools. Certain existing approaches focus on reducing the size of an image to preserve disk space, but the examples herein not only reduce the size but also, reduce the contents of the container in a manner that simplifies downloading, installing, and updating processes during deployment of the container. Other approaches attempt to merge image layers, but in the examples herein, the relationships between layers are understood such that layers can be excluded from a deployment. The examples herein reduce the number of layers and the amount of data of image files by determining which layers to include in a container.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing a process (or multiple processes) that, e.g., facilitates granular real-time data attainment and delivery including as relevant to soliciting, generating, and timely transmitting, granular product review to consumers. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as a code block for deploying applications on-demand through container images 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
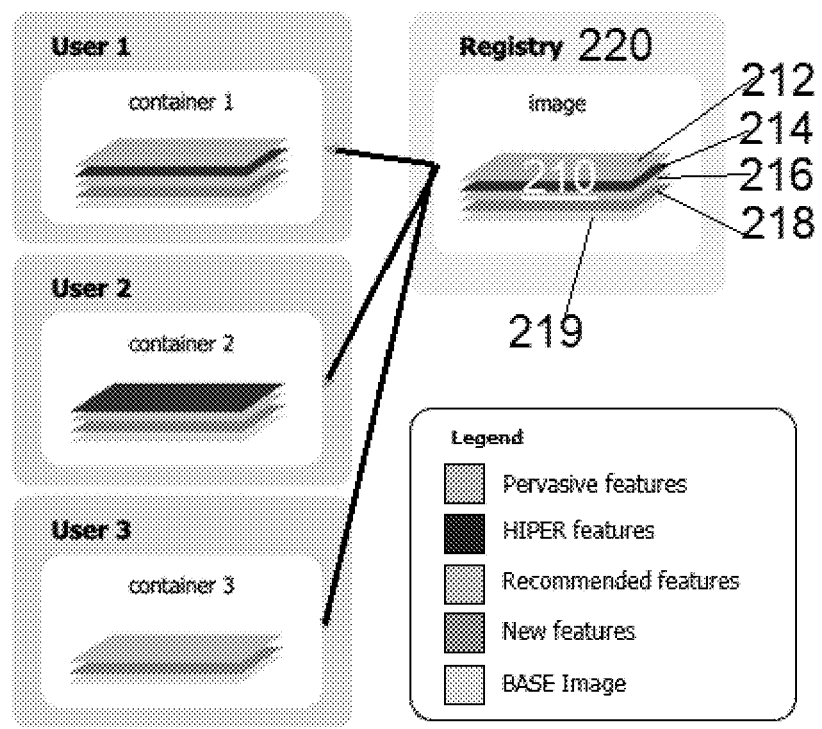
FIG. 2 illustrates an existing method of generating a container.
Figure 3:
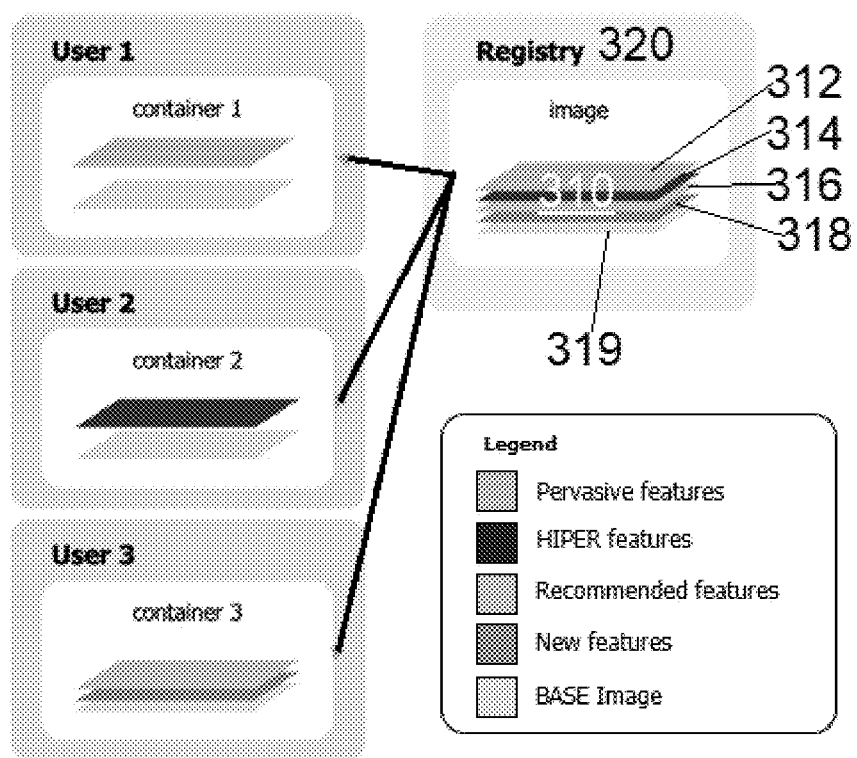
FIG. 3 illustrates some aspects of the examples herein when generating a container.

FIGS. 2 and 3 illustrate contrast existing techniques of generating containers with aspects of some embodiments of the present invention. FIG. 2 illustrates a present technique while FIG. 3 illustrates how the present examples of generating flexible on-demand containers generate containers that reduce the number of layers and the amount of data of image files by eliminating the inclusion of extraneous image layers in a container.

FIG. 2 illustrates the requirements of various users, user 1, user 2, and user 3 and how each of these users will be provided, by an existing system, from a registry 220, with a container that includes image layers. In each case, the program code includes the image layers with the features sought by the user, but also all subsequent layers in the stack. In this example, the registry 220 image 210, includes layers for pervasive features 212, HIPER features 214, recommended features 216, new features 218, and a base image 219. In this example, user 1 desires pervasive features 212, user 2 desires HIPER features 214, and user 3 desires both recommended features 216 and new features 218. The program code in this existing system generates, from the registry 220 image 110, container 1 for user 1, which includes pervasive features 212, HIPER features 214, recommended features 216, new features 218, and a base image 219. The program code in this existing system generates, from the registry 220 image 210, container 2 for user 2, which includes HIPER features 214, recommended features 216, new features 218, and a base image 219. The program code in this existing system generates, from the registry 220 image 210, container 3 for user 3, which includes recommended features 216, new features 218, and a base image 219. Thus, for each user to obtain the desired features, the user must also obtain any features below that feature in the stack in the registry 220 image 210. FIG. 3 illustrates an example of the present technique in which the users can obtain containers with only the layers which they desire/request, and the base image.

In FIG. 3, user 1 desires pervasive features 312, user 2 desires HIPER features 314, and user 3 desires both recommended features 316 and new features 318. The program code generates, from the registry 320 image 310, container 1 for user 1, which includes pervasive features 312, and a base image 319, container 2 for user 2, which includes HIPER features 314 and a base image 319, and container 3 for user 3, which includes recommended features 316, new features 318, and a base image 319.

For illustrative purposes only, certain functionalities discussed herein are separated into modules (which can be hardware, software, or both), but the separation of the functionalities is just one possible embodiment. The separation is provided for ease of understanding, only, and not to impose any structural limitations. For example, program code comprising an ILDGP (Incremental Layer Directed Graph Producer) module and program code comprising a IRGC (Incremental Layer Directed Graph Consumer) module are illustrated as separate entities.

In the examples herein, a resource can download an image upon request that includes all image layers, but a resource can also download images on demand and the layers included in the download can be based on dependencies.

Figure 4:
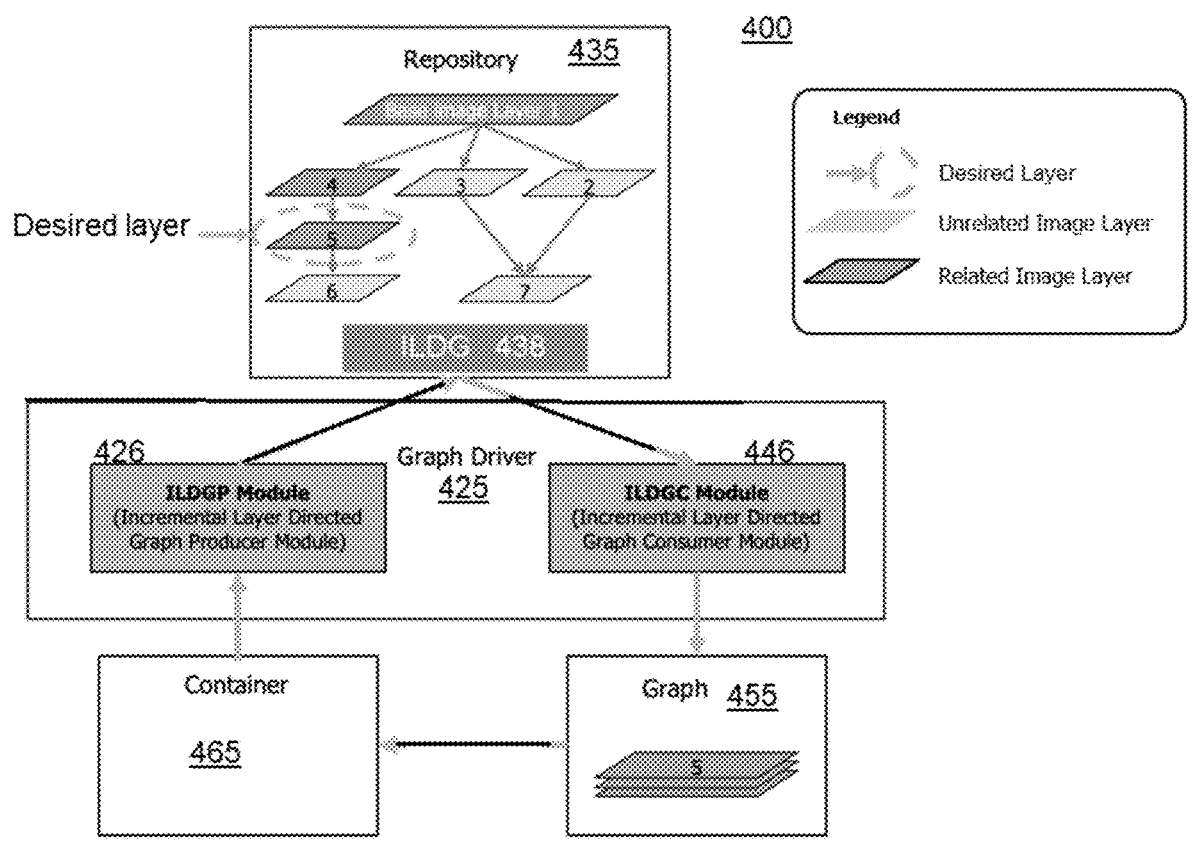
FIG. 4 illustrates some aspects of the certain functionalities of various embodiments of the present invention.

Thus, the resource can specify a new option and/or environmental variable, and the program code can provide a container with image layers based on the request and determining the dependencies (e.g., based on identifying dependent sequences and submissive sequences). FIG. 4 illustrates elements of an architecture 400 where a resource can download images on demand with layers based on the specified option or environmental variable.

FIG. 4 illustrates elements of a technical architecture 400 from which a resource has requested elements in image layer 5. In some examples herein, including in the architecture 400 of FIG. 4, program code operates within a graph driver 425. Graph drivers enable the union filesystem. Also referred to as storage drivers, graph drivers are used in configuring layered container images. A graph driver consolidates multiple image layers into a root filesystem for the mount namespace of a container. The graph driver controls how images and containers are stored and managed on a host (a system that runs a container process). In the graph driver 425 of FIG. 4, program code comprising an ILDGP module 426 generates a directed graph, an ILDG, 438 by building a submissive sequence and a dependent sequence of the image layers (1-7, wherein 1 is the base image layer) after analyzing the timestamp of uploading and the modification of the files. In this example, layer 5 was requested and the program code determines that layer 4 and base layer 1 are related to layer 5. Program code comprising an ILDGC module 446 in graph driver 425 consumes the ILDG 438 of image layers by pulling the image from a repository 435 to a graph 455, to deploy updated services or layers on demand through a container 465.

Figure 5:
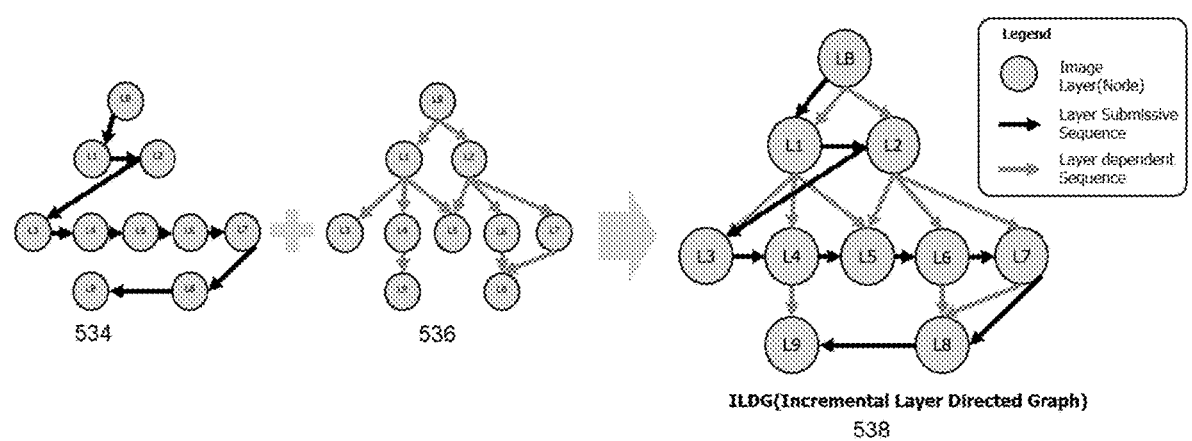
FIG. 5 illustrates some aspects of the certain functionalities of various embodiments of the present invention.

FIG. 5 illustrates how program code in embodiments of the present invention generates a directed graph (e.g., an ILDG) 538 by identifying submissive sequence (based on the timestamp of uploading layer) and dependent sequence (based on the modification of files) relationships between image layers (e.g., L1-L8 with LB as the base layer). The program code generates a submissive node 534 and a dependent node 536 configuration and combines them to generate an ILDG 538.

The program generates an ILDG based on whether files were modified (dependent sequence) and based on the timing when files were uploaded (submissive sequence). Either type of dependency between layers means that when one layer is requested, the other layer is part of the container generated by the program code to refresh the requested layer. The base layer is the root of an ILDG (including in FIG. 5) and thus included as a dependent layer. If a layer in a repository was committed after a base layer, this layer is in a submissive sequence with the base layer. If the base layer and a layer modify the same file, they are in a dependent sequence. If a given layer is committed after a requested layer, that given layer is in a submissive sequence to the requested layer. If two layers (which are not the base layer) modify the same file, they are in a dependent sequence.

Figure 6:
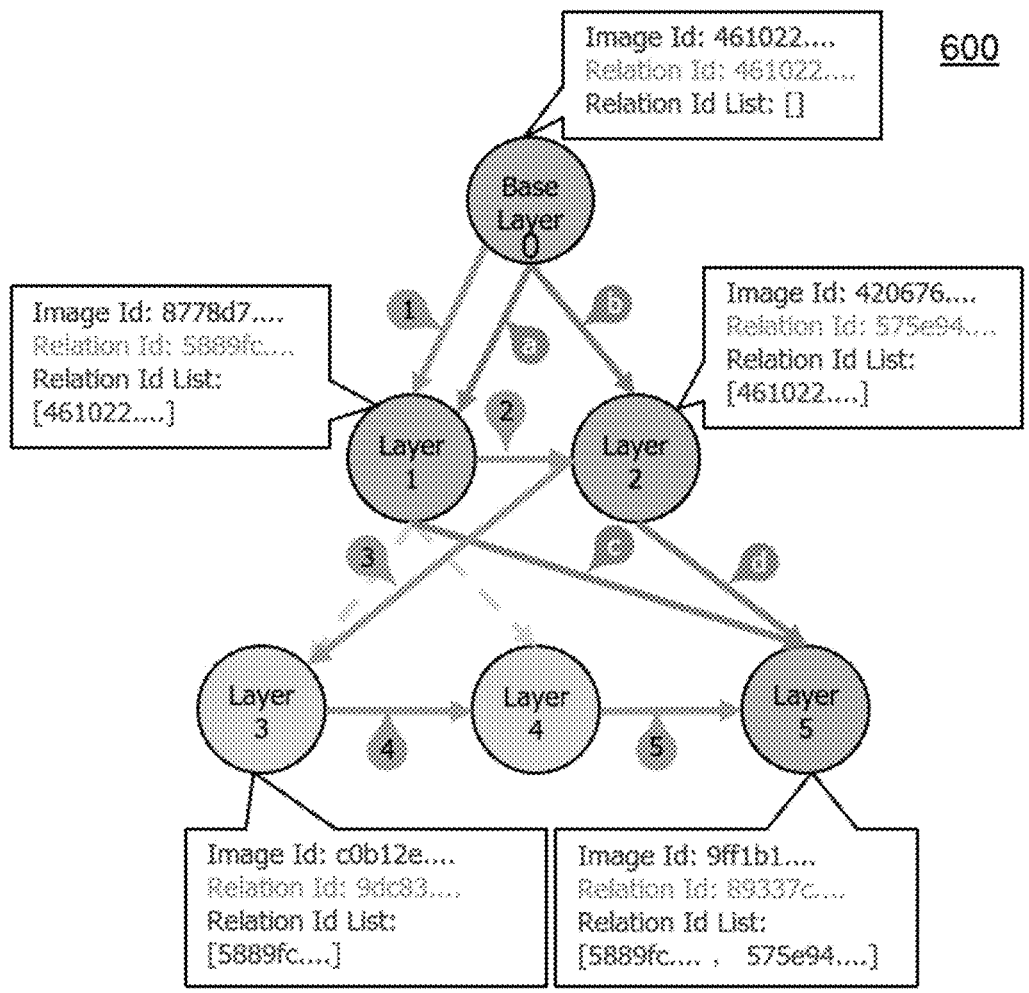
FIG. 6 illustrates some aspects of the certain aspects of a directed graph generated by various embodiments of the present invention.

As aforementioned, to identify dependencies between image layers, program code in embodiments of the present invention utilizes two variables, Relation ID and Relation ID List. Each image layer also has an image identifier, Image ID. Relation ID of a root is the same as its Image ID. Relation ID uniquely matches an image layer. The Relation ID List can be utilized to verify the integrity of a downloaded image. The program code calculates a Relation ID for each node by submitting all the ancestor submissive nodes' Image IDs through a hash algorithm (e.g., SHA256. For example, $Relation\_ID_{L5}=SHA256(Image\_ID_{LB}+Image\_ID_{L1}+ \ldots +Image\_ID_{L4})$. The program code records a node's and all its parent dependent nodes' Relation IDs in a Relation ID List. The program code builds a dependent sequence through the Relation ID list. These relationships 600 are illustrated in FIG. 6. FIG. 6 includes a base layer 0 and layers 1-5. Submissive sequences between the nodes (image layers) are designated with lower case letters and dependent sequences between the nodes (image layers) are designated with numbers.

In FIG. 6, nodes L1 and L2 are the parents of node L5, so $Relation\_ID\_List_{L5}=[Relation\_ID_{L1},Relation\_ID_{L2}]$. Referring to FIG. 6, a resource can download images that have a submissive sequence relationship by Image ID. For example, when a resource requests to download an image with $Image\_ID_{L5}$(9ff1b1 . . . ), the program code will generate and deploy a container with layers L5, L4, L3, L2, L1, LB. A resource can also download images that have a dependent sequence by Relation ID. For example, when the resource requests to download an image with $Relation\_ID_{L5}$ (89337c . . . ), program code will generate and deploy a container with layers L5, L2, L1, LB.

Figure 7:
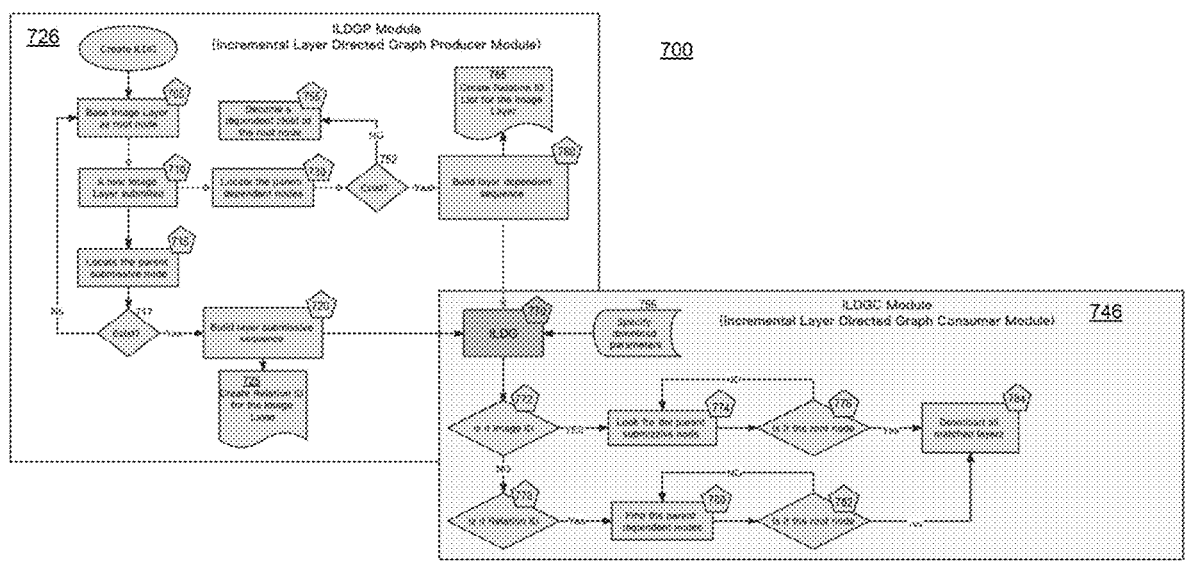
FIG. 7 depicts a workflow that illustrates various aspects of some embodiments of the present invention.

FIG. 7 is a workflow 700 that illustrates various aspects of the program code that generate the dependencies between the image layers and generates the container. For ease of understanding, various aspects are separated into two modules, the ILDGP module 726 and the ILDGC module 746, but this is merely one suggestion for a possible configuration of the program code. In some examples, the program code of the ILDGP module 726 generates an ILDG (e.g., directed graph) or any other structure in which dependencies between image layers can be represented. To generate the ILDG (or similar structure), the program code sets a base layer image as a root node (705). The program code obtains a submission of given image layer (710). In order to generate the ILDG, the program code will evaluate each image layer in turn. FIG. 7 illustrates the program code of the ILDGP module 726 evaluating a given layer. The program code repeats the illustration workflow to evaluate each layer.

In FIG. 7, upon submission of the layer, the program code determines if a parent submissive node exists (717) for the submitted image layer (715). The program code can locate the parent submissive node with the attribute image layers list. When the program code determines that there is a submissive sequence between the submitted layer (node) and its parent node, it builds a submissive sequence (720). To mark the submissive sequence, the program code generates a Relation ID for the image layer (725). The program code also determines a dependent sequence, if any exists, by identifying any parent dependent node with a dependency between images (730). If the program code determines that the dependency exists (752) the program code builds a dependent sequence (760). The program code memorializes this relationship by generating a Relation ID List for the image layer (765). If the program code determines that the submitted image layer does not have parent dependent nodes, the program code designates the submitted image layer as a dependent child of the root (i.e., base) layer (755). As aforementioned, a dependent sequence is based on the modification of the files. The program code generates an ILDG based on the dependent sequence and the submissive sequence and the program code of the ILDGC 746 obtains the ILDG (770).

The program code of the ILDGC 746 obtains download parameters from a user/resource of a computing system that include a request for elements comprising a given image layer (766). The program code parses the parameters to determine if the parameters comprise an Image ID (766). If the parameters comprise an Image ID, based on the Image ID, the program code identifies a parent submissive node for the requested image layer (774), including determining whether the root node is the parent node (776). After identifying parent submissive nodes, the program code generates a download of the layers matched via this relationship (submissive sequence) (784), as the container. The requesting resource can download and execute this container. Alternatively, if the parameters specify a Relation ID, the program code, based on the Relation ID, identifies parent dependent nodes (780), including determining whether the root node is the parent dependent node (782). After identifying parent dependent nodes, the program code generates a download of the layers matched via this relationship (dependent sequence) (784), as the container. The program code deploys the container to the requesting resource (and/or to any resources that the program code determines should be updated).

Embodiments of the present invention include computer-implemented methods, computer systems, and computer program products that comprise program code automatically generating and deploying applications on-demand through container images. In some examples, the program code obtains a first container. The first container includes image layers, where the image layers include a base image layer and one or more image layers. The program code determines dependencies between the image layers. The program code obtains a request for an application, where at least one image layer of the one or more image layers comprises features of the application. The program code identifies, based on the dependencies, at least one additional image layer related to the at least one image layer. The program code generates and deploys a second container, where image layers of the second container consist of the at least one image layer, the at least one additional image layer related to the at least one image layer, and the base layer.

In some examples, the program code determines dependencies between the layers by generating a submissive sequence. The program code generates a submissive sequence by: for each layer of the one or more layers, determining, based on comparing a timestamp associated with the layer to one or more timestamps associated with the one or more layers, which layers of the one or more layers were committed after the layer, based on determining that at least one layer of the one or more layers was committed after the layer, for each layer of the at least one layer committed after the layer, creating a dependency between the at least one layer committed after the layer and the layer, wherein the dependency comprises the submissive sequence, and based on determining that no layer of the one or more layers was committed after the layer, creating the dependency between the layer and the base layer, wherein the dependency between the layer and the base layer comprises the submissive sequence.

In some examples, the program code determines dependencies between the layers by generating a dependent sequence. The program code generates the dependent sequence by, for each layer of the one or more layers: determining, based on comparing a timestamp associated with the layer to one or more timestamps associated with the one or more layers, which layers of the one or more layers modify a common file with the layer, based on determining that at least one layer of the one or more layers modifies the common file with the layer, for each layer of the at least one layer determined to be modifying the common file with the layer, creating a dependency between the at least one layer and the layer determined to be modifying the common file with the layer, wherein the dependency comprises the dependent sequence, and based on determining that no layer of the one or more layers modifies the common file with the layer, creating the dependency between the layer and the base layer, wherein the dependency between the layer and the base layer comprises the dependent sequence.

In some examples, the program code determines dependencies between the layers by generating a submissive sequence and generating a dependent sequence. The program code generates a submissive sequence by: for each layer of the one or more layers, determining, based on comparing a timestamp associated with the layer to one or more timestamps associated with the one or more layers, which layers of the one or more layers were committed after the layer, based on determining that at least one layer of the one or more layers was committed after the layer, for each layer of the at least one layer committed after the layer, creating a dependency between the at least one layer committed after the layer and the layer, wherein the dependency comprises the submissive sequence, and based on determining that no layer of the one or more layers was committed after the layer, creating the dependency between the layer and the base layer, wherein the dependency between the layer and the base layer comprises the submissive sequence. The program code generates the dependent sequence by, for each layer of the one or more layers: determining, based on comparing a timestamp associated with the layer to one or more timestamps associated with the one or more layers, which layers of the one or more layers modify a common file with the layer, based on determining that at least one layer of the one or more layers modifies the common file with the layer, for each layer of the at least one layer determined to be modifying the common file with the layer, creating a dependency between the at least one layer and the layer determined to be modifying the common file with the layer, wherein the dependency comprises the dependent sequence, and based on determining that no layer of the one or more layers modifies the common file with the layer, creating the dependency between the layer and the base layer, wherein the dependency between the layer and the base layer comprises the dependent sequence.

In some examples, the program code determining dependencies between the layers further comprises the program code generating a directed graph to represent the dependencies.

In some examples, the program code stores the directed graph in a repository.

In some examples, the program code appends attributes to the one or more image layers to track the dependencies.

In some examples, the attributes comprise a relationship identifier. A relationship identifier for a given image layer identifies each layer of the one or more layers that was committed after the given image layer was committed.

In some examples, the attributes comprise a relationship identifier list, where a relationship identifier list appended to a given image layer identifies each layer of the one or more layers that modifies a common file with the given image layer.

In some examples, each image layer comprises a unique image identifier. The relationship identifier of the given image layer comprises a hash of unique image identifiers for the one or more layers that were committed after the given image layer was committed.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of comprising:
   requesting execution of an instruction to perform an action defined by the instruction, wherein the action defined by the instruction comprises automatically generating and deploying applications on-demand through container images, wherein the executing the instruction includes:
   obtaining a first container comprising image layers, wherein the image layers include a base image layer and one or more image layers;
   generating dependencies between the image layers, wherein the dependencies comprise, for each layer of the one or more layers, a submissive sequence and a dependent sequence, wherein the submissive sequence for each layer is based on determining if at least one layer of the one or more layers was committed after the layer, and wherein the dependent sequence for each layer is based on based on determining if at least one layer of the one or more layers modifies a common file with the layer;
   obtaining a request for an application, wherein at least one image layer of the one or more image layers comprises features of the application;
   identifying based on the dependencies, at least one additional image layer related to the at least one image layer; and
   generating and deploying a second container, wherein image layers of the second container consist of the at least one image layer, the at least one additional image layer related to the at least one image layer, and the base layer.

2. The computer-implemented of claim 1, wherein generating the submissive sequence comprises:
   for each layer of the one or more layers:
      determining, based on comparing a timestamp associated with the layer to one or more timestamps associated with the one or more layers, which layers of the one or more layers were committed after the layer;
      based on determining that the at least one layer of the one or more layers was committed after the layer, for each layer of the at least one layer committed after the layer, creating a dependency between the at least one layer committed after the layer and the layer, wherein the dependency comprises the submissive sequence; and
      based on determining that no layer of the one or more layers was committed after the layer, creating the dependency between the layer and the base layer, wherein the dependency between the layer and the base layer comprises the submissive sequence.

3. The computer-implemented of claim 1, wherein generating the dependent sequence comprises:
   for each layer of the one or more layers:
      determining, based on comparing a timestamp associated with the layer to one or more timestamps associated with the one or more layers, which layers of the one or more layers modify the common file with the layer;
      based on determining that the at least one layer of the one or more layers modifies the common file with the layer, for each layer of the at least one layer determined to be modifying the common file with the layer, creating a dependency between the at least one layer and the layer determined to be modifying the common file with the layer, wherein the dependency comprises the dependent sequence; and
      based on determining that no layer of the one or more layers modifies the common file with the layer, creating the dependency between the layer and the base layer, wherein the dependency between the layer and the base layer comprises the dependent sequence.

4. The computer-implemented method of claim 1, wherein generating dependencies between the layers comprises:
   generating the submissive sequence, comprising:
      for each layer of the one or more layers:
         determining, based on comparing a timestamp associated with the layer to one or more timestamps associated with the one or more layers, which layers of the one or more layers were committed after the layer;
         based on determining that at least one layer of the one or more layers was committed after the layer, for each layer of the at least one layer committed after the layer, creating a first dependency between the at least one layer committed after the layer and the layer, wherein the first dependency comprises the submissive sequence; and
         based on determining that no layer of the one or more layers was committed after the layer, creating the first dependency between the layer and the base layer, wherein the first dependency between the layer and the base layer comprises the submissive sequence; and generating the dependent sequence, comprising:
for each layer of the one or more layers:
determining, based on comparing a timestamp associated with the layer to one or more timestamps associated with the one or more layers, which layers of the one or more layers modify the common file with the layer;
based on determining that at least one layer of the one or more layers modifies the common file with the layer, for each layer of the at least one layer that modifies the common file with the layer, creating a second dependency between the at least one layer that modifies the common file with the layer and the layer, wherein the second dependency comprises the dependent sequence; and
based on determining that no layer of the one or more layers modifies the common file with the layer, creating the second dependency between the layer and the base layer, wherein the second dependency between the layer and the base layer comprises the dependent sequence.

5. The computer-implemented method of claim 4, wherein generating dependencies between the layers further comprises:
generating, by the one or more processors, a directed graph to represent the dependencies.

6. The computer-implemented method of claim 5, further comprising:
storing, by the one or more processors, the directed graph in a repository.

7. The computer-implemented method of claim 1, further comprising:
appending, by the one or more processors, attributes to the one or more image layers to track the dependencies.

8. The computer-implemented method of claim 7, wherein the attributes comprise a relationship identifier, and wherein a relationship identifier for a given image layer identifies each layer of the one or more layers that was committed after the given image layer was committed.

9. The computer-implemented method of claim 7, wherein the attributes comprise a relationship identifier list, wherein a relationship identifier list appended to a given image layer identifies each layer of the one or more layers that modifies the common file with the given image layer.

10. The computer-implemented method of claim 8, wherein each image layer comprises a unique image identifier, and wherein the relationship identifier of the given image layer comprises a hash of unique image identifiers for the one or more layers that were committed after the given image layer was committed.

11. A computer system comprising:
at least one computing device;
a set of one or more computer-readable storage media; and
program instructions, collectively stored in the set of one or more computer-readable storage media, for causing the at least one computing device to perform computer operations to automatically generate and deploy applications on-demand through container images, the computer operations including:
obtaining a first container comprising image layers, wherein the image layers include a base image layer and one or more image layers;
generating dependencies between the image layers, wherein the dependencies comprise, for each layer of the one or more layers, a submissive sequence and a dependent sequence, wherein the submissive sequence for each layer is based on determining if at least one layer of the one or more layers was committed after the layer, and wherein the dependent sequence for each layer is based on based on determining if at least one layer of the one or more layers modifies a common file with the layer;
obtaining a request for an application, wherein at least one image layer of the one or more image layers comprises features of the application;
identifying based on the dependencies, at least one additional image layer related to the at least one image layer; and
generating and deploying a second container, wherein image layers of the second container consist of the at least one image layer, the at least one additional image layer related to the at least one image layer, and the base layer.

12. The computer system of claim 11, wherein generating the submissive sequence comprises:
for each layer of the one or more layers:
determining, based on comparing a timestamp associated with the layer to one or more timestamps associated with the one or more layers, which layers of the one or more layers were committed after the layer;
based on determining that at least one layer of the one or more layers was committed after the layer, for each layer of the at least one layer committed after the layer, creating a dependency between the at least one layer committed after the layer and the layer, wherein the dependency comprises the submissive sequence; and
based on determining that no layer of the one or more layers was committed after the layer, creating the dependency between the layer and the base layer, wherein the dependency between the layer and the base layer comprises the submissive sequence.

13. The computer system of claim 11, wherein generating the dependent sequence comprises:
for each layer of the one or more layers:
determining, based on comparing a timestamp associated with the layer to one or more timestamps associated with the one or more layers, which layers of the one or more layers modify the common file with the layer;
based on determining that at least one layer of the one or more layers modifies the common file with the layer, for each layer of the at least one layer determined to be modifying the common file with the layer, creating a dependency between the at least one layer and the layer determined to be modifying the common file with the layer, wherein the dependency comprises the dependent sequence; and
based on determining that no layer of the one or more layers modifies the common file with the layer, creating the dependency between the layer and the base layer, wherein the dependency between the layer and the base layer comprises the dependent sequence.

14. The computer system of claim 11, wherein generating dependencies between the layers comprises:
generating the submissive sequence, comprising:
for each layer of the one or more layers:
determining, based on comparing a timestamp associated with the layer to one or more timestamps associated with the one or more layers, which layers of the one or more layers were committed after the layer;

based on determining that at least one layer of the one or more layers was committed after the layer, for each layer of the at least one layer committed after the layer, creating a first dependency between the at least one layer committed after the layer and the layer, wherein the first dependency comprises the submissive sequence; and based on determining that no layer of the one or more layers was committed after the layer, creating the first dependency between the layer and the base layer, wherein the first dependency between the layer and the base layer comprises the submissive sequence; and generating the dependent sequence, comprising:

for each layer of the one or more layers:

determining, based on comparing a timestamp associated with the layer to one or more timestamps associated with the one or more layers, which layers of the one or more layers modify the common file with the layer;

based on determining that at least one layer of the one or more layers modifies the common file with the layer, for each layer of the at least one layer that modifies the common file with the layer, creating a second dependency between the at least one layer that modifies the common file with the layer and the layer, wherein the second dependency comprises the dependent sequence; and based on determining that no layer of the one or more layers modifies the common file with the layer, creating the second dependency between the layer and the base layer, wherein the second dependency between the layer and the base layer comprises the dependent sequence.

15. The computer system of claim 14, wherein generating dependencies between the layers further comprises:

generating, by the one or more processors, a directed graph to represent the dependencies.

16. The computer system of claim 15, the computer operations further comprising:

storing the directed graph in a repository.

17. The computer system of claim 11, the computer operations further comprising:

appending attributes to the one or more image layers to track the dependencies.

18. The computer system of claim 17, wherein the attributes comprise a relationship identifier, and wherein a relationship identifier for a given image layer identifies each layer of the one or more layers that was committed after the given image layer was committed.

19. The computer system of claim 17, wherein the attributes comprise a relationship identifier list, wherein a relationship identifier list appended to a given image layer identifies each layer of the one or more layers that modifies the common file with the given image layer.

20. A computer program product comprising:

a set of one or more computer-readable storage media; and program instructions, collectively stored in the set of one or more computer-readable storage media, for causing at least one computing device to perform computer operations to automatically generate and deploy applications on-demand through container images, the computer operations including:

obtaining a first container comprising image layers, wherein the image layers include a base image layer and one or more image layers;

generating dependencies between the image layers, wherein the dependencies comprise, for each layer of the one or more layers, a submissive sequence and a dependent sequence, wherein the submissive sequence for each layer is based on determining if at least one layer of the one or more layers was committed after the layer, and wherein the dependent sequence for each layer is based on based on determining if at least one layer of the one or more layers modifies a common file with the layer;

obtaining a request for an application, wherein at least one image layer of the one or more image layers comprises features of the application;

identifying based on the dependencies, at least one additional image layer related to the at least one image layer; and generating and deploying a second container, wherein image layers of the second container consist of the at least one image layer, the at least one additional image layer related to the at least one image layer, and the base layer.

* * * * *